(12) United States Patent
Fujita et al.

(10) Patent No.: US 11,188,177 B2
(45) Date of Patent: *Nov. 30, 2021

(54) IN-CELL LIQUID CRYSTAL PANEL AND LIQUID CRYSTAL DISPLAY DEVICE

(71) Applicant: NITTO DENKO CORPORATION, Ibaraki (JP)

(72) Inventors: Masakuni Fujita, Ibaraki (JP); Satoshi Yamamoto, Ibaraki (JP); Yusuke Toyama, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/498,708

(22) PCT Filed: Mar. 28, 2018

(86) PCT No.: PCT/JP2018/012770
§ 371 (c)(1),
(2) Date: Sep. 27, 2019

(87) PCT Pub. No.: WO2018/181477
PCT Pub. Date: Oct. 4, 2018

(65) Prior Publication Data
US 2021/0157186 A1    May 27, 2021

(30) Foreign Application Priority Data
Mar. 28, 2017 (JP) .............................. JP2017-062232

(51) Int. Cl.
*G02F 1/1333* (2006.01)
*G02F 1/1335* (2006.01)
(Continued)

(52) U.S. Cl.
CPC ........ *G06F 3/0443* (2019.05); *G02F 1/13338* (2013.01); *G02F 1/133528* (2013.01); *G02F 1/134363* (2013.01); *G06F 3/0412* (2013.01)

(58) Field of Classification Search
None
See application file for complete search history.

(56) References Cited

U.S. PATENT DOCUMENTS 8,692,948 B2 * 4/2014 Park ...................... G06F 3/0446
349/40
10,775,923 B2 * 9/2020 Kurasawa ............. G06F 3/0443
(Continued)

FOREIGN PATENT DOCUMENTS

CN    101018839 A    8/2007
CN    101681221 A    3/2010
(Continued)

OTHER PUBLICATIONS

Notification of Transmittal of Translation of the International Preliminary Report on Patentability (Form PCT/IB/338) issued in counterpart International Application No. PCT/JP2018/012770 dated Oct. 10, 2019 with Forms PCT/IB/373 and PCT/ISA/237. (6 pages).
(Continued)

*Primary Examiner* — Duane N Taylor, Jr.
(74) *Attorney, Agent, or Firm* — Westerman, Hattori, Daniels & Adrian, LLP

(57) ABSTRACT

An in-cell type liquid crystal panel is disclosed containing: an in-cell type liquid crystal cell provided with a liquid crystal layer including liquid crystal molecules homogeneously aligned in the absence of an electric field, a first transparent substrate and a second transparent substrate sandwiching the liquid crystal layer, and a touch sensing electrode unit related to touch sensor and touch-driven functions disposed between the first transparent substrate and the second transparent substrate; and a pressure-sensi-
(Continued)

tive adhesive layer attached polarizing film disposed, via a first pressure-sensitive adhesive layer and without interposing a conductive layer, to the first transparent substrate side on the viewing side of the in-cell type liquid crystal cell; wherein the pressure-sensitive adhesive layer attached polarizing film contains a first polarizing film, an anchor layer, and a first pressure-sensitive adhesive layer; the anchor layer includes a conductive polymer; and the first pressure-sensitive adhesive layer includes an antistatic agent.

11 Claims, 3 Drawing Sheets

(51) Int. Cl.
   *G02F 1/1343*   (2006.01)
   *G06F 3/041*    (2006.01)
   *G06F 3/044*    (2006.01)

(56) References Cited

U.S. PATENT DOCUMENTS

| | | | |
|---|---|---|---|
| 2006/0279923 A1 | 12/2006 | Kim et al. | |
| 2009/0017298 A1 | 1/2009 | Okada et al. | |
| 2010/0001976 A1 | 1/2010 | Jiang et al. | |
| 2010/0028564 A1 | 2/2010 | Cheng et al. | |
| 2010/0182273 A1 | 7/2010 | Noguchi et al. | |
| 2011/0181813 A1 | 7/2011 | Kim et al. | |
| 2011/0285640 A1 | 11/2011 | Park et al. | |
| 2012/0062511 A1* | 3/2012 | Ishizaki | G06F 3/0445 345/174 |
| 2012/0300299 A1 | 11/2012 | Yasui et al. | |
| 2013/0044074 A1 | 2/2013 | Park et al. | |
| 2013/0120314 A1* | 5/2013 | Ishibashi | G02F 1/13338 345/174 |
| 2013/0271832 A1 | 10/2013 | Youki et al. | |
| 2013/0330550 A1 | 12/2013 | Toyama et al. | |
| 2013/0335942 A1 | 12/2013 | Kuriyama et al. | |
| 2014/0085722 A1 | 3/2014 | Yasui et al. | |
| 2014/0104510 A1 | 4/2014 | Wang et al. | |
| 2014/0152943 A1 | 6/2014 | Dorjgotov et al. | |
| 2014/0255689 A1 | 9/2014 | Yasui et al. | |
| 2014/0322457 A1 | 10/2014 | Yasui et al. | |
| 2015/0293287 A1 | 10/2015 | Yasui et al. | |
| 2015/0301385 A1 | 10/2015 | Tsunekawa | |
| 2015/0353787 A1 | 12/2015 | Nagata et al. | |
| 2015/0368525 A1 | 12/2015 | Yasui et al. | |
| 2016/0062510 A1 | 3/2016 | Tomohisa et al. | |
| 2016/0084995 A1 | 3/2016 | Kitagawa | |
| 2016/0085007 A1 | 3/2016 | Akizuki et al. | |
| 2016/0130478 A1 | 5/2016 | Nagata et al. | |
| 2016/0152843 A1 | 6/2016 | Hwang et al. | |
| 2016/0185083 A1 | 6/2016 | Yasui et al. | |
| 2016/0195645 A1 | 7/2016 | Yasui et al. | |
| 2016/0349413 A1 | 12/2016 | Nakata et al. | |
| 2016/0357079 A1* | 12/2016 | Chen | G06F 3/0412 |
| 2017/0022396 A1 | 1/2017 | Kimura et al. | |
| 2017/0059756 A1 | 3/2017 | Yoo et al. | |
| 2017/0121565 A1 | 5/2017 | Yasui et al. | |
| 2018/0039145 A1 | 2/2018 | Liao et al. | |
| 2018/0157111 A1 | 6/2018 | Ueki et al. | |
| 2018/0356565 A1 | 12/2018 | Tsuburaya et al. | |
| 2020/0033673 A1 | 1/2020 | Fujita et al. | |
| 2021/0103173 A1 | 4/2021 | Fujita et al. | |

FOREIGN PATENT DOCUMENTS

| | | | |
|---|---|---|---|
| CN | 102099716 A | 6/2011 | |
| CN | 102112900 A | 6/2011 | |
| CN | 103483987 A | 1/2014 | |
| CN | 104737045 A | 6/2015 | |
| CN | 104781363 A | 7/2015 | |
| CN | 104861891 A | 8/2015 | |
| CN | 105103016 A | 11/2015 | |
| CN | 105339816 A | 2/2016 | |
| CN | 105738998 A | 7/2016 | |
| CN | 106133096 A | 11/2016 | |
| CN | 106133813 A | 11/2016 | |
| CN | 106199807 A | 12/2016 | |
| JP | 2001235625 A * | 1/2007 | .......... G09D 201/00 |
| JP | 2008-517138 A | 5/2008 | |
| JP | 2009-35722 A | 2/2009 | |
| JP | 2009-229521 A | 10/2009 | |
| JP | 2009-237489 A | 10/2009 | |
| JP | 2009-242786 A | 10/2009 | |
| JP | 2010-020313 A | 1/2010 | |
| JP | 2011-528447 A | 11/2011 | |
| JP | 2011-252948 A | 12/2011 | |
| JP | 2012-63839 A | 3/2012 | |
| JP | 2012-247574 A | 12/2012 | |
| JP | 2013-105154 A | 5/2013 | |
| JP | 2013-253202 A | 12/2013 | |
| JP | 2014-81935 A | 5/2014 | |
| JP | 2014-112184 A | 6/2014 | |
| JP | 2014-141647 A | 8/2014 | |
| JP | 2015-108098 A | 6/2015 | |
| JP | 2015-199942 A | 11/2015 | |
| JP | 2016-102148 A | 6/2016 | |
| JP | 2016-107498 A | 6/2016 | |
| JP | 2016-130747 A | 7/2016 | |
| JP | 2016-148724 A | 8/2016 | |
| JP | 2016-224182 A | 12/2016 | |
| JP | 2016-224307 A | 12/2016 | |
| JP | 2017068022 A | 4/2017 | |
| JP | 6636596 B2 | 1/2020 | |
| KR | 10-2009-0027930 A | 3/2009 | |
| KR | 10-2013-0054137 A | 5/2013 | |
| KR | 10-2015-0051937 A | 5/2015 | |
| KR | 10-2016-0034219 A | 3/2016 | |
| KR | 10-2016-0141750 A | 12/2016 | |
| TW | 201001010 A | 1/2010 | |
| TW | 201020621 A | 6/2010 | |
| TW | 201115219 A | 5/2011 | |
| TW | 201222357 A | 6/2012 | |
| TW | 201333136 A | 8/2013 | |
| TW | 201345991 A | 11/2013 | |
| TW | 201402725 A | 1/2014 | |
| TW | 201432003 A | 8/2014 | |
| TW | 201542736 A | 11/2015 | |
| TW | 201614284 A | 4/2016 | |
| TW | 201700690 A | 1/2017 | |
| TW | 201707979 A | 3/2017 | |
| WO | 2006/132500 A1 | 12/2006 | |
| WO | 2009/119664 A1 | 10/2009 | |
| WO | 2012/039279 A1 | 3/2012 | |
| WO | 2015/152201 A1 | 10/2015 | |
| WO | 2016/208716 A1 | 12/2016 | |
| WO | 2017/014225 A1 | 1/2017 | |

OTHER PUBLICATIONS

Office Action dated Oct. 22, 2020, issued in counterpart CN Patent Application No. 201880021944.3 (3 pages).
Search Report dated Oct. 13, 2020, issued in counterpart CN Patent Application No. 201880021944.3, w/English translation (3 pages).
Office Action dated Jan. 5, 2021, issued in counterpart CN Application No. 202010673243.7, with English translation (14 pages).
Office Action dated Mar. 2, 2021, issued in counterpart TW Application No. 108130485, with English translation (9 pages).
International Search Report dated Jun. 19, 2018, issued in counterpart International Application No. PCT/JP2018/012770 (2 pages).
Official Letter and Search Report dated Dec. 25, 2018, issued in counterpart TW application No. 107110683, with English translation (11 pages).
Notice of Reasons for Refusal dated Jun. 5, 2019, issued in counterpart JP application No. 2018-207448, with English translation (6 pages).
Notice of Reasons for Refusal dated Sep. 22, 2020, issued in counterpart Korean Patent Application No. 10-2020-7019876, with English translation (8 pages).

(56) References Cited

OTHER PUBLICATIONS

Office Action dated Mar. 11, 2020, issued in counterpart JP Application No. 2018-549279, with English Translation. (7 pages).
Office Action dated Nov. 30, 2018, issued in TW Application No. 107110677 (counterpart to U.S. Appl. No. 16/497,903), with English translation. (11pages).
International Search Report dated Jun. 19, 2018, issued in application No. PCT/JP2018/012630 (counterpart to U.S. Appl. No. 16/497,903). (2 pages).
Notification of Transmittal of Translation of the International Preliminary Report on Patentabililty (Form PCT/IB/338) issued in International Application No. PCT/JP2018/012630 (counterpart to U.S. Appl. No. 16/497,903) dated Oct. 10, 2019 with Forms PCT/IB/373 and PCT/ISA/237. (10 pages).
Office Action dated May 29, 2020, issued in JP application No. 2019-509939 (counterpart to U.S. Appl. No. 16/497,903), with English translation. (8 pages).
Office Action dated Aug. 31, 2020, issued in KR Application No. 10-2019-7031218 (counterpart to U.S. Appl. No. 16/497,903), with English translation. (8 pages).
Office Action dated Dec. 9, 2020, issued in TW Application No. 108118245 (counterpart to U.S. Appl. No. 16/497,903), with English translation. (11 pages).
Office Action dated Mar. 18, 2021, issued in CN application No. 201880021984.8 (counterpart to U.S. Appl. No. 16/497,903), with English translation. (25 pages).
International Search Report dated Jun. 19, 2018, issued in International Application No. PCT/JP2018/012775 (counterpart to U.S. Appl. No. 16/499,019)(2 pages).
Notice of Reasons for Refusal dated Jun. 17, 2019, issued in JP application No. 2019-509976 (counterpart to U.S. Appl. No. 16/499,019), with English translation. (12 pages).
Official Letter and Search Report dated Dec. 26, 2018, issued in TW application No. 107110681 (counterpart to U.S. Appl. No. 16/499,019), with English translation. (11 pages).
Notification of Transmittal of Translation of the International Preliminary Report on Patentability (Form PCT/IB/338) issued in International Application No. PCT/JP2018/012775 (counterpart to U.S. Appl. No. 16/499,019) dated Oct. 10, 2019 with Forms PCT/IB/373 and PCT/ISA/237. (7 pages).
Office Action dated Dec. 25, 2019, issued in JP application No. 2019-509976 (counterpart to U.S. Appl. No. 16/499,019), with English translation. (10 pages).
Office Action dated May 19, 2020, issued in JP Application No. 2019-509976 (counterpart to U.S. Appl. No. 16/499,019), with English translation. (11 pages).
Office Action dated Mar. 12, 2020, issued in JP Application No. 2019-509976 (counterpart to U.S. Appl. No. 16/499,019), with English translation. (30 pages).
Office Action dated Mar. 20, 2020, issued in KR Application No. 10-2019-7027779 (counterpart to U.S. Appl. No. 16/499,019), with English translation. (9 pages).
Office Action dated Aug. 24, 2020, issued in KR Application No. 10-2019-7027779 (counterpart to U.S. Appl. No. 16/499,019), with English translation. (7 pages).
Office Action dated Dec. 22, 2020, issued in KR Application No. 10-2019-7027779 (counterpart to U.S. Appl. No. 16/499,019), with English translation. (9 pages).

Office Action dated May 25, 2021, issued in counterpart KR application No. 10-2020-7019876, with English translation. (6 pages).
Notice of Allowance dated Apr. 21, 2021, issued in U.S. Appl. No. 16/499,019. (13 pages).
Final Office Action dated Nov. 30, 2020, issued in U.S. Appl. No. 16/499,019. (16 pages).
Non-Final Office Action dated Jun. 11, 2020, issued in U.S. Appl. No. 16/499,019. (28 pages).
Non-Final Office Action dated Dec. 28, 2020, issued in U.S. Appl. No. 16/497,903. (35 pages).
International Search Report dated Jun. 19, 2018, issued in International Application No. PCT/JP2018/012808 (counterpart to U.S. Appl. No. 16/498,251) (2 page).
Notice of Reasons for Refusal dated Jul. 31, 2019, issued in JP Application No. 2019-509989 (counterpart to U.S. Appl. No. 16/498,251) , with English translation. (10 pages).
Notification of Transmittal of Translation of the International Preliminary Report on Patentabililty (Form PCT/IB/338) issued in International Application No. PCT/JP2018/012808 (counterpart to U.S. Appl. No. 16/498,251) dated Oct. 10, 2019 with Forms PCT/IB/373 and PCT/ISA/237 (9 pages).
Office Action dated Oct. 15, 2019, issued in TW Application No. 107110679 (counterpart to U.S. Appl. No. 16/498,251), with English translation. (13 pages).
Office Action dated Jan. 22, 2020, issued in JP Application No. 2019-509989 (counterpart to U.S. Appl. No. 16/498,251), with English translation. (9 pages).
Office Action dated Apr. 3, 2020, issued in JP Application No. 2019-509989 (counterpart to U.S. Appl. No. 16/498,251), with English translation. (10 pages).
Office Action dated Aug. 27, 2020, issued in JP Application No. 2020-119256, with English translation. (10 pages).
Office Action dated Apr. 7, 2021, issued in CN Application No. 201880021947.7, with English translation. (31 pages).
Non-Final Office Action dated Oct. 14, 2020, issued in U.S. Appl. No. 16/498,251. (26 pages).
Final Office Action dated Jul. 20, 2021, issued in U.S. Appl. No. 16/497,903. (19 pages).
Office Action dated Jun. 7, 2021, issued in KR application No. 10-2019-7027066, with English translation. (8 pages).
Taiwanese Search Report dated May 26, 2021, issued in TW Application No. 108130846 (counterpart to U.S. Appl. No. 16/499,019), with English translation. (2 pages).
Office Action dated Jul. 14, 2021, issued in counterpart KR Application No. 10-2020-7019876, with English translation. (8 pages).
Office Action dated Aug. 19, 2021, issued in counterpart TW application No. 108118245, with English translation. (11 pages).
Office Action dated Aug. 26, 2021, issued in CN application No. 201880021984.8 (counterpart to U.S. Appl. No. 16/497,903), with English translation. (18 pages).
Office Action dated Aug. 31, 2021, issued in JP application No. 2020-134437 (counterpart to U.S. Appl. No. 16/499,019), with English translation. (6 pages).
Office Action dated Sep. 15, 2021, issued in CN application No. 201880021947.7 (counterpart to U.S. Appl. No. 16/498,251), with English translation. (26 pages).

* cited by examiner

IN-CELL LIQUID CRYSTAL PANEL AND LIQUID CRYSTAL DISPLAY DEVICE

TECHNICAL FIELD

The present invention relates to an in-cell type liquid crystal cell in which a touch sensing function is incorporated, and an in-cell type liquid crystal panel comprising a pressure-sensitive adhesive layer attached polarizing film on the viewing side of the in-cell type liquid crystal cell. Further, the present invention relates to a liquid crystal display device using the liquid crystal panel. The liquid crystal display device with a touch sensing function using the in-cell type liquid crystal panel of the present invention can be used as various input display devices for mobile devices and the like.

BACKGROUND ART

Generally, in liquid crystal display devices, polarizing films are bonded to both surfaces of a liquid crystal cell with a pressure-sensitive adhesive layer interposed therebetween from the viewpoint of image forming system. In addition, ones that mount a touch panel on a display screen of a liquid crystal display device have been put to practical use. As the touch panel, there are various methods such as an electrostatic capacitance type, a resistive film type, an optical type, an ultrasonic type, an electromagnetic induction type and the like, but an electrostatic capacitance type is increasingly adopted. In recent years, a liquid crystal display device provided with a touch sensing function that incorporates an electrostatic capacitance sensor as a touch sensor unit is used.

On the other hand, at the time of manufacturing a liquid crystal display device, when attaching the pressure-sensitive adhesive layer attached polarizing film to a liquid crystal cell, a release film is peeled from the pressure-sensitive adhesive layer of the pressure-sensitive adhesive layer attached polarizing film, and static electricity is generated by such peeling. Static electricity is also generated when a surface protective film of the polarizing film stuck to the liquid crystal cell is peeled off or when a surface protective film of a cover window is peeled off. The static electricity generated in this way affects the alignment of the liquid crystal layer inside the liquid crystal display device, resulting in causing defects. Generation of static electricity can be suppressed, for example, by forming an antistatic layer on the outer surface of the polarizing film.

On the other hand, the electrostatic capacitance sensor in the liquid crystal display device provided with a touch sensing function detects a weak electrostatic capacitance formed by the transparent electrode pattern and the finger when the user's finger approaches the surface. In the case where a conductive layer such as an antistatic layer is provided between the transparent electrode pattern and the user's finger, the electric field between the driving electrode and the sensor electrode is disturbed, the sensor electrode capacitance becomes unstable and the touch panel sensitivity decreases, causing malfunction. In the liquid crystal display device provided with a touch sensing function, it is required to suppress the occurrence of static electricity and suppress the malfunction of the electrostatic capacitance sensor. For example, in order to reduce the occurrence of display defects and malfunctions in a liquid crystal display device provided with a touch sensing function for the purpose of solving the above-mentioned problems, it has been proposed to dispose a polarizing film comprising an antistatic layer with a surface resistance value of $1.0\times10^9$ to $1.0\times10^{11}\Omega/\square$ on the viewing side of the liquid crystal layer (Patent Document 1).

PRIOR ART DOCUMENTS

Patent Document

Patent Document 1: JP-A-2013-105154

According to the polarizing film comprising an antistatic layer described in Patent Document 1, generation of static electricity can be suppressed to some extent. However, in Patent Document 1, since the place where the antistatic layer is arranged is further away from the fundamental position where static electricity is generated, this case is not effective as compared with the case where the antistatic function is imparted to the pressure-sensitive adhesive layer. Further, in a liquid crystal display device provided with a touch sensing function using an in-cell type liquid crystal cell, it was found that conduction from the side surface can be imparted by providing a conduction structure on the side surface of the polarizing film, but when the antistatic layer is thin, the contact area with the conduction structure on the side surface is small, so that sufficient conductivity cannot be obtained, resulting in failure to obtain sufficient conduction. On the other hand, it was found that the sensitivity of the touch sensor decreases as the thickness of the antistatic layer increases.

On the other hand, the pressure-sensitive adhesive layer to which an antistatic function is imparted is effective for suppressing generation of static electricity and preventing static electricity unevenness more than the antistatic layer provided on the polarizing film. However, it was found that when the conductive function of the pressure-sensitive adhesive layer is enhanced with importance placed on the antistatic function of the pressure-sensitive adhesive layer, the touch sensor sensitivity is lowered. In particular, it was found that the touch sensor sensitivity is lowered in the liquid crystal display device provided with a touch sensing function using the in-cell type liquid crystal cell. Further, it was found that the antistatic agent blended into the pressure-sensitive adhesive layer for enhancing the conductivity function segregates at the interface with the polarizing film in a humidified environment (after a humidification reliability test) or is shifted to the interface on the viewing side of the liquid crystal cell, so that the durability is not sufficient.

The purpose of the present invention is to provide an in-cell type liquid crystal panel comprising an in-cell type liquid crystal cell and a pressure-sensitive adhesive layer attached polarizing film applied to the viewing side thereof, the panel having an excellent antistatic function and satisfying touch sensor sensitivity and durability in a humidified environment.

Another object of the present invention is to provide a liquid crystal display device using the in-cell type liquid crystal panel.

Means for Solving the Problems

As a result of extensive studies to solve the problems, the present inventors have found that the problems can be solved by the following in-cell type liquid crystal panel and have completed the present invention.

That is, the present invention relates to an in-cell type liquid crystal panel comprising:
an in-cell type liquid crystal cell that is provided with a liquid crystal layer including liquid crystal molecules homogeneously aligned in the absence of an electric field, a first transparent substrate and a second transparent substrate sandwiching the liquid crystal layer from both surfaces, and a touch sensing electrode unit related to touch sensor and touch-driven functions disposed between the first transparent substrate and the second transparent substrate; and a pressure-sensitive adhesive layer attached polarizing film that is disposed, via a first pressure-sensitive adhesive layer and without interposing a conductive layer, to the first transparent substrate side on the viewing side of the in-cell type liquid crystal cell;

wherein the pressure-sensitive adhesive layer attached polarizing film comprises a first polarizing film, an anchor layer, and a first pressure-sensitive adhesive layer in this order;

the anchor layer includes a conductive polymer; and the first pressure-sensitive adhesive layer includes an antistatic agent.

In the in-cell type liquid crystal panel, a conduction structure may be formed on the side surfaces of the anchor layer and the first pressure-sensitive adhesive layer of the pressure-sensitive adhesive layer attached polarizing film.

In the in-cell type liquid crystal panel, it is preferable that the anchor layer has a thickness of 0.01 to 0.5 µm and a surface resistance value of $1 \times 10^8$ to $1 \times 10^{12} \Omega/\square$:

the first pressure-sensitive adhesive layer has a thickness of 5 to 100 µm and a surface resistance value of $1 \times 10^8$ to $1 \times 10^{12} \Omega/\square$; and the surface resistance value of the pressure-sensitive adhesive layer side of the pressure-sensitive adhesive layer attached polarizing film is $1 \times 10^8$ to $1 \times 10^{11} \Omega/\square$.

In the in-cell type liquid crystal panel, as the antistatic agent, an alkali metal salt and/or an organic cation-anion salt may be contained.

In the in-cell type liquid crystal panel, the touch sensing electrode unit disposed between the liquid crystal layer and the first transparent substrate or the second transparent substrate may be used. The touch sensing electrode unit disposed between the liquid crystal layer and the first transparent substrate may be used, and the touch sensing electrode unit disposed between the liquid crystal layer and the second transparent substrate can be also used.

In the in-cell type liquid crystal panel, the touch sensing electrode unit formed by a touch sensor electrode and a touch driving electrode can be used.

In the in-cell type liquid crystal panel, when the touch sensing electrode unit is disposed between the liquid crystal layer and the first transparent substrate or the second transparent substrate, the touch sensing electrode unit can include an electrode integrally formed with a touch sensor electrode and a touch driving electrode.

The in-cell type liquid crystal panel may further include a second polarizing film disposed on the second transparent substrate side of the in-cell type liquid crystal cell with a second pressure-sensitive adhesive layer interposed therebetween.

The present invention also relates to a liquid crystal display device comprising the in-cell type liquid crystal panel.

Effect of the Invention

The pressure-sensitive adhesive layer attached polarizing film on the viewing side in the in-cell type liquid crystal panel of the present invention contains a conductive polymer in the anchor layer and an antistatic agent in the pressure-sensitive adhesive layer and is given an antistatic function.

Accordingly, in the in-cell type liquid crystal panel, when a conduction structure is provided on each side surface of the anchor layer and the pressure-sensitive adhesive layer, it is possible to make contact with the conduction structure and to ensure a sufficient contacting area. Therefore, conduction is ensured at the side surfaces of the respective layers of the anchor layer and the pressure-sensitive adhesive layer, so that occurrence of static electricity unevenness due to poor conduction can be suppressed.

The surface resistance value of each layer of the anchor layer and the pressure-sensitive adhesive layer in the pressure-sensitive adhesive layer attached polarizing film of the present invention can be controlled within a predetermined range, so that the surface resistance value on the pressure-sensitive adhesive layer side of the pressure-sensitive adhesive layer attached polarizing film can also be controlled so as to fall within a predetermined range. As described above, while the pressure-sensitive adhesive layer attached polarizing film of the present invention is controlled such that the sensitivity of the touch sensor is not lowered and the durability in a humidified environment is not deteriorated, it is possible to lower each surface resistance value of the anchor layer and the pressure-sensitive adhesive layer, so that a predetermined antistatic function can be imparted. Therefore, the pressure-sensitive adhesive layer attached polarizing film of the present invention can satisfy touch sensor sensitivity and durability in a humidified environment while having a good antistatic function.

MODE FOR CARRYING OUT THE INVENTION

Figure 1:
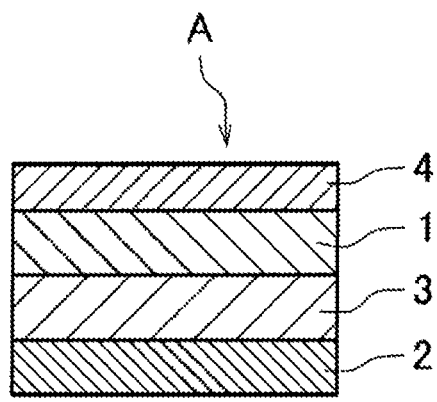
FIG. 1 is a cross-sectional view showing an example of a pressure-sensitive adhesive layer attached polarizing film to be used on a viewing side of an in-cell type liquid crystal panel of the present invention.

Hereinafter, the present invention will be described with reference to the drawings. As shown in FIG. 1, the pressure-sensitive adhesive layer attached polarizing film A to be used for the viewing side of the in-cell type liquid crystal panel of the present invention comprises a first polarizing film 1, an anchor layer 3, and a first pressure-sensitive adhesive layer 2 in this order. Further, a surface-treated layer 4 may be provided on the side of the first polarizing film 1 on which the anchor layer 3 is not provided. FIG. 1 illustrates a case where the pressure-sensitive adhesive layer attached polarizing film A comprises the surface-treated layer 4. The pressure-sensitive adhesive layer attached polarizing film A of the present invention is disposed on the side of a transparent substrate 41 on the viewing side of the in-cell type liquid crystal cell B by the pressure-sensitive adhesive layer 2 shown in FIGS. 2 to 6. Although not shown in FIG. 1, a separator may be provided in the first pressure-sensitive adhesive layer 2 of the pressure-sensitive adhesive layer attached polarizing film A of the present invention, and a surface protective film may be provided on the surface-treated layer 4 (the first polarizing film 1 in the case of comprising no surface-treated layer 4).

The thickness of the anchor layer 3 is preferably from 0.01 to 0.5 µm, more preferably from 0.01 to 0.2 µm, even more preferably from 0.01 to 0.1 µm, from the viewpoints of the stability of the surface resistance value and the tackiness to the pressure-sensitive adhesive layer. The surface resistance value of the anchor layer 3 is preferably $1\times10^8$ to $1\times10^{12}\Omega/\square$, more preferably $1\times10^8$ to $1\times10^{11}\Omega/\square$, even more preferably $1\times10^8$ to $1\times10^{10}\Omega/\square$, from the viewpoint of antistatic function and touch sensor sensitivity.

The thickness of the first pressure-sensitive adhesive layer 2 is preferably from 5 to 100 µm, more preferably from 5 to 50 m, even more preferably from 10 to 35 µm, from the viewpoint of ensuring the durability and securing the contact area with the side surface conduction structure. In addition, the surface resistance value of the first pressure-sensitive adhesive layer 2 is preferably $1\times10^8$ to $1\times10^{12}\Omega/\square$, more preferably $1\times10^8$ to $1\times10^{11}\Omega/\square$, even more preferably $1\times10^8$ to $1\times10^{10}\Omega/\square$, from the viewpoint of antistatic function and touch sensor sensitivity.

The surface resistance value of the pressure-sensitive adhesive layer attached polarizing film A on the pressure-sensitive adhesive layer 2 side is preferably controlled to $1\times10^8$ to $1\times10^{11}\Omega/\square$ so that the antistatic function is satisfied, the sensitivity of the touch sensor is lowered, and the durability is not deteriorated in a humidified environment. The surface resistance value can be adjusted by controlling the surface resistance values of the anchor layer 3 and the first pressure-sensitive adhesive layer 2, respectively. The surface resistance value is preferably $1\times10^8$ to $6\times10^{10}\Omega/\square$, more preferably $1\times10^8$ to $4\times10^{10}\Omega/\square$.

Hereinafter, the pressure-sensitive adhesive layer attached polarizing film A will be described. As described above, the pressure-sensitive adhesive layer attached polarizing film A of the present invention comprises the first polarizing film 1, the anchor layer 3, and the first pressure-sensitive adhesive layer 2 in this order. Further, such polarizing film A may comprise a surface-treated layer 4.

<First Polarizing Film>

As the first polarizing film, one comprising a transparent protective film on one side or both surfaces of a polarizer is generally used. The polarizer is not particularly limited but various kinds of polarizer may be used. Examples of the polarizer, include a film obtained by uniaxial stretching after a dichromatic substance, such as iodine and dichroic dye, is adsorbed to a hydrophilic polymer film, such as polyvinyl alcohol type film, partially formalized polyvinyl alcohol type film, and ethylene-vinyl acetate copolymer type partially saponified film, a polyene type alignment film, such as dehydrated polyvinyl alcohol and dehydrochlorinated polyvinyl chloride, and the like. Among them, a polarizer composed of a polyvinyl alcohol type film and a dichroic substance such as iodine is suitable. Thickness of these polarizers is not particularly limited but is generally about 80 µm or less.

As the polarizer, a thin polarizer having a thickness of 10 µm or less can be used. From the viewpoint of thinning, the thickness is preferably 1 to 7 µm. Such a thin type polarizer is preferable because the thickness unevenness is small, the visibility is excellent, and the dimensional change is small, resulting in excellent durability and further in that the thickness as the polarizing film can be thinned.

As a material constituting the transparent protective film, for example, a thermoplastic resin excellent in transparency, mechanical strength, thermal stability, moisture barrier property, isotropy, and the like is used. Specific examples of such thermoplastic resins include cellulose resins (e.g. triacetyl cellulose, etc.), polyester resins, polyether sulfone resins, polysulfone resins, polycarbonate resins, polyamide resins, polyimide resins, polyolefin resins, (meth)acrylic resins, cyclic polyolefin resins (norbornene resins), polyarylate resins, polystyrene resins, polyvinyl alcohol resins, and mixtures thereof. The transparent protective film is laminated on one side of the polarizer with an adhesive layer, but on the other side, as a transparent protective film, a thermosetting resin or an ultraviolet curing resin, such as a (meth)acrylic resin, a urethane-based resin, an acrylic urethane-based resin, an epoxy-based resin, and a silicone-based resin, can be used. One or more arbitrary suitable additives may be contained in the transparent protective film.

The adhesive used for bonding the polarizer and the transparent protective film is not particularly limited as long as it is optically transparent, and various types such as aqueous type adhesives, solvent type adhesives, hot melt type adhesives, radical curable type adhesives, and cationic curable type adhesives are used. However, an aqueous type adhesive or a radical curable type adhesive is preferable.

<Antistatic Agent>

Examples of the antistatic agent include materials that can impart antistatic properties, such as an ionic surfactant, a conductive polymer, and conductive fine particles, and the like. As the antistatic agent, an ionic compound can be used.

Examples of the ionic surfactant include cationic surfactants (for example, quaternary ammonium salt type, phosphonium salt type, sulfonium salt type, etc.), anionic surfactants (carboxylic acid type, sulfonate type, sulfate type, phosphate type, phosphite type, etc.), amphoteric surfactants (sulfobetaine type, alkylbetain type, alkylimidazolium betaine type, etc.) or nonionic surfactants (polyhydric alcohol derivative, β-cyclodextrin inclusion compound, sorbitan fatty acid monoester/diester, polyalkylene oxide derivative, amine oxide, etc.).

Examples of the conductive polymer include polymers of polyaniline-based, polythiophene-based, polypyrrole-based, polyquinoxaline-based, and the like, among which polymers such as polyaniline and polythiophene which are likely to be water soluble conductive polymers or water dispersible conductive polymers are preferably used. Polythiophene is particularly preferable.

As the conductive fine particles, metal oxides such as tin oxide type, antimony oxide type, indium oxide type, zinc oxide type and the like can be listed. Among these, tin oxide type is preferable. Examples of tin oxide type materials include antimony-doped tin oxide, indium-doped tin oxide, aluminum-doped tin oxide, tungsten-doped tin oxide, titanium oxide-cerium oxide-tin oxide complex, titanium oxide-tin oxide complex and the like, in addition to tin oxide. The average particle diameter of the fine particles is about 1 to 100 nm, preferably 2 to 50 nm.

Further, as other antistatic agents, there are exemplified polymers having an ion conductivity, such as a homopolymer of a monomer having an ion conductive group such as acetylene black, ketjen black, natural graphite, artificial graphite, titanium black, cation type (quaternary ammonium salt etc.), amphoteric type (betaine compound etc.), anion type (sulfonic acid salt etc.) or nonionic type (glycerin etc.), a copolymer of the above monomer and another monomer, and a polymer having a site derived from an acrylate or a methacrylate having a quaternary ammonium base; and a permanent antistatic agent of a type in which a hydrophilic polymer such as a polyethylene methacrylate copolymer is alloyed to an acrylic resin or the like.

<<Ionic Compound>>

As the ionic compound, an alkali metal salt and/or an organic cation-anion salt can be preferably used. As the alkali metal salt, an organic salt and an inorganic salt of an alkali metal can be used. The "organic cation-anion salt" in the present invention means an organic salt, the cation moiety of which is composed of an organic substance and the anion moiety may be an organic substance or an inorganic substance. The "organic cation-anion salt" is also called an ionic liquid or an ionic solid.

<Alkali Metal Salt>

Examples of alkali metal ions forming the cation part of the alkali metal salt include lithium, sodium, and potassium ions. Among these alkali metal ions, a lithium ion is preferable.

The anion moiety of the alkali metal salt may be composed of an organic substance or an inorganic substance. Examples of the anion moiety constituting the organic salt include $CH_3COO^-$, $CF_3COO^-$, $CH_3SO_3^-$, $CF_3SO_3^-$, $(CF_3SO_2)_3C^-$, $C_4F_9SO_3^-$, $C_3F_7COO^-$, $(CF_3SO_2)(CF_3CO)N^-$, $(FSO_2)_2N^-$, $^-O_3S(CF_2)_3SO_3^-$, $PF_6^-$, $CO_3^{2-}$, and the following general formulas (1) to (4):

$$(C_nF_{2n+1}SO_2)_2N^- \quad (1):$$

(wherein n is an integer of 1 to 10), $$CF_2(C_mF_{2m}SO_2)_2N^- \quad (2):$$

(wherein m is an integer of 1 to 10), $$^-O_3S(CF_2)_lSO_3^- \quad (3):$$

(wherein l is an integer of 1 to 10), $$(C_pF_{2p+1}SO_2)N^-(C_qF_{2q+1}SO_2) \quad (4):$$

(wherein p and q are each an integer of 1 to 10), and the like. In particular, an anion moiety containing a fluorine atom is preferably used since such a moiety is able to give an ionic compound having a good ion dissociation property. Examples of the anion moiety constituting the inorganic salt to be used include $Cl^-$, $Br^-$, $I^-$, $AlCl_4^-$, $Al_2Cl_7^-$, $BF_4^-$, $PF_6^-$, $ClO_4^-$, $NO_3^-$, $AsF_6^-$, $SbF_6^-$, $NbF_6^-$, $TaF_6^-$, $(CN)_2N^-$, and the like. As the anion moiety, (perfluoroalkylsulfonyl)imide represented by the general formula (1), such as $(CF_3SO_2)_2N^-$ and $(C_2F_5SO_2)_2N^-$, are preferable, and (trifluoromethanesulfonyl)imide represented by $(CF_3SO_2)_2N^-$ is particularly preferable.

Specific examples of the alkali metal organic salt include preferably sodium acetate, sodium alginate, sodium lignin sulfonate, sodium toluene sulfonate, $LiCF_3SO_3$, $Li(CF_3SO_2)_2N$, $Li(CF_3SO_2)_2N$, $Li(C_2F_5SO_2)_2N$, $Li(C_4F_9SO_2)_2N$, $Li(CF_3SO_2)_3C$, $KO_3S(CF_2)_3SO_3K$, and $LiO_3S(CF_2)_3SO_3K$. Among these, $LiCF_3SO_3$, $Li(CF_3SO_2)_2N$, $Li(C_2F_5SO_2)_2N$, $Li(C_4F_9SO_2)_2N$, $Li(CF_3SO_2)_3C$, and the like are preferable, and fluorine-containing lithium imide salts such as $Li(CF_3SO_2)_2N$, $Li(C_2F_5SO_2)_2N$, $Li(C_4F_9SO_2)_2N$, and the like are more preferable, and (perfluoroalkyl-sulfonyl)imide lithium salts are particularly preferred.

Examples of the alkali metal inorganic salt include lithium perchlorate and lithium iodide.

<Organic Cation Anion Salt>

The organic cation-anion salt used in the present invention is composed of a cation component and an anion component, and the cation component is composed of an organic substance. Specific examples of the cation component include a pyridinium cation, a piperidinium cation, a pyrrolidinium cation, a cation having a pyrroline skeleton, a cation having a pyrrole skeleton, an imidazolium cation, a tetrahydropyrimidinium cation, a dihydropyrimidinium cation, a pyrazolium cation, a pyrazolinium cation, a tetraalkylammonium cation, a trialkylsulfonium cation, a tetraalkylphosphonium cation, and the like.

Examples of the anion component to be used include $Cl^-$, $Br^-$, $I^-$, $AlCl_4^-$, $Al_2Cl_7^-$, $BF_4^-$, $PF_6^-$, $ClO_4^-$, $NO_3^-$, $CH_3COO^-$, $CF_3COO^-$, $CH_3SO_3^-$, $CF_3SO_3^-$, $(CF_3SO_2)_3C^-$, $AsF_6^-$, $SbF_6^-$, $NbF_6^-$, $TaF_6^-$, $(CN)_2N^-$, $C_4F_9SO_3^-$, $C_3F_7COO^-$, $(CF_3SO_2)(CF_3CO)N^-$, $(FSO_2)_2N^-$, $O_3(CF_2)_3SO_3^-$, and the following general formulas (1) to (4):

$$(C_nF_{2n+1}SO_2)_2N^- \quad (1):$$

(wherein n is an integer of 1 to 10), $$CF_2(C_mF_{2m}SO_2)_2N^- \quad (2):$$

(wherein m is an integer of 1 to 10), $$^-O_3S(CF_2)_lSO_3^- \quad (3):$$

(wherein l is an integer of 1 to 10), $$(C_pF_{2p+1}SO_2)_N^-C_qF_{2q+1}SO_2) \quad (4):$$

(wherein p and q are each an integer of 1 to 10), and the like. Among these, an anion component containing a fluorine atom is particularly preferably used since an ionic compound having a good ion dissociation property can be obtained.

In addition to the alkali metal salt and the organic cation-anion salt, examples of the ionic compound include inorganic salts such as ammonium chloride, aluminum chloride, copper chloride, ferrous chloride, ferric chloride, ammonium sulfate, and the like. These ionic compounds can be used alone or in combination thereof.

<Anchor Layer>

As described above, the anchor layer is preferably formed so as to have a thickness of 0.01 to 0.5 μm and a surface resistance value of $1 \times 10^8$ to $1 \times 10^{12} \Omega/\square$. The anchor layer can be formed from various antistatic compositions. As the antistatic agent for forming the anchor layer, a conductive polymer is used.

Among these antistatic agents, the conductive polymer is preferably used from the viewpoints of the optical properties, appearance, antistatic effect, and stability of antistatic effect under heating or during humidification. In particular, conductive polymers such as polyaniline and polythiophene are preferably used. Those which are soluble in an organic solvent or water or are dispersible in water can be appropriately used as a conductive polymer, but a water-soluble conductive polymer or a water-dispersible conductive polymer is preferably used. The water-soluble conductive polymer and the water-dispersible conductive polymer can be prepared as an aqueous solution or an aqueous dispersion of a coating liquid for forming the antistatic layer and the coating liquid does not need to use a nonaqueous organic solvent. Thus, deterioration of the optical film substrate due to the organic solvent can be suppressed. The aqueous solution or aqueous dispersion may contain an aqueous solvent in addition to water. For example, it is possible to use alcohols such as methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, and cyclohexanol.

In addition, it is preferable that the water-soluble conductive polymer or the water-dispersible conductive polymer such as polyaniline and polythiophene have a hydrophilic functional group in the molecule. Examples of the hydrophilic functional group include a sulfone group, an amino group, an amide group, an imino group, a quaternary ammonium base, a hydroxyl group, a mercapto group, a hydrazino group, a carboxyl group, a sulfate group, a phosphate group, or salts thereof. By having a hydrophilic functional group in the molecule, the conductive polymer is easily dissolved in water or easily dispersed to fine particles in water, thereby to be able to easily prepare the water-soluble conductive polymer or water-dispersible conductive polymer. When a polythiophene polymer is used, polystyrene sulfonic acid is usually used in combination.

Examples of commercially available water-soluble conductive polymers include polyaniline sulfonic acid (weight average molecular weight in terms of polystyrene conversion: 150,000, manufactured by Mitsubishi Rayon Co., Ltd.) and the like. Examples of commercially available water-dispersible conductive polymers include polythiophene-based conductive polymers (trade name: DENATRON series, manufactured by Nagase ChemteX Corporation) and the like.

As a material for forming the anchor layer, a binder component can be added together with the conductive polymer for the purpose of improving the film forming property of a conductive polymer and the adhesiveness to an optical film. In the case where the conductive polymer is an aqueous material such as a water-soluble conductive polymer or a water-dispersible conductive polymer, a water-soluble or water-dispersible binder component is used. Examples of the binder include oxazoline group-containing polymers, polyurethane resins, polyester resins, acrylic resins, polyether resins, cellulose resins, polyvinyl alcohol resins, epoxy resins, polyvinyl pyrrolidone, polystyrene resins, polyethylene glycol, pentaerythritol, and the like. In particular, polyurethane resins, polyester resins and acrylic resins are preferred. One or two or more kinds of these binders can be appropriately used according to the purpose.

The amount of each of the conductive polymer and the binder used is preferably controlled so that the surface resistance value of the obtained anchor layer is $1\times10^8$ to $1\times10^{12}\Omega/\square$ although such amount depends on the type thereof.

<First Pressure-Sensitive Adhesive Layer>

As described above, the first pressure-sensitive adhesive layer is preferably formed so as to have a thickness of 5 to 100 μm and a surface resistance value of $1\times10^8$ to $1\times10^{12}\Omega/\square$. The first pressure-sensitive adhesive layer can be formed from a composition in which an antistatic agent is blended with various pressure-sensitive adhesives.

As the pressure-sensitive adhesive for forming the first pressure-sensitive adhesive layer, various pressure-sensitive adhesives can be used. Examples of the pressure-sensitive adhesives include rubber pressure-sensitive adhesives, acrylic pressure-sensitive adhesives, silicone pressure-sensitive adhesives, urethane pressure-sensitive adhesives, vinyl alkyl ether pressure-sensitive adhesives, polyvinylpyrrolidone pressure-sensitive adhesives, polyacrylamide pressure-sensitive adhesives, cellulose pressure-sensitive adhesives, and the like. A pressure-sensitive adhesive base polymer is selected depending on the type of the adhesives. Among the above-mentioned pressure-sensitive adhesives, an acrylic pressure-sensitive adhesive is preferably used from the viewpoints of excellent optical transparency, suitable adhesive properties such as wettability, cohesiveness and adhesion property, and excellent weather resistance, heat resistance and the like.

The acrylic pressure-sensitive adhesive contains a (meth) acrylic polymer as a base polymer. The (meth)acrylic polymer usually contains, as a monomer unit, an alkyl (meth) acrylate as a main component. Incidentally, (meth)acrylate refers to acrylate and/or methacrylate and the "(meth)" is used in the same meaning in this specification.

As the alkyl (meth)acrylate forming the main skeleton of the (meth)acrylic polymer, linear or branched alkyl groups each having 1 to 18 carbon atoms can be exemplified. These can be used alone or in combination. The average number of carbon atoms of these alkyl groups is preferably 3 to 9.

Also, from the viewpoints of adhesive properties, durability, adjustment of retardation, adjustment of refractive index, and the like, an alkyl (meth)acrylate containing an aromatic ring, such as phenoxyethyl (meth)acrylate and benzyl (meth)acrylate, can be used.

One or more kinds of copolymerization monomers having a polymerizable functional group with an unsaturated double bond such as (meth)acryloyl group or vinyl group can be introduced into the (meth)acrylic polymer by copolymerization for the purpose of improving adhesion property and heat resistance. Specific examples of such copolymerization monomer include hydroxyl group-containing monomers, such as 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth) acrylate, and (4-hydroxymethylcyclohexyl)-methyl acrylate; carboxyl group-containing monomers, such as (meth) acrylic acid, carboxyethyl (meth)acrylate, carboxypentyl (meth)acrylate, itaconic acid, maleic acid, fumaric acid, and crotonic acid; acid anhydride group-containing monomers, such as maleic acid anhydride and itaconic acid anhydride; caprolactone adduct of acrylic acid; sulfonic acid group-containing monomers, such as styrene sulfonic acid, allylsulfonic acid, 2-(meth)acrylamide-2-methylpropane sulfonic acid, (meth)acrylamidopropane sulfonic acid, sulfopropyl (meth)acrylate, and (meth)acryloyloxynaphthalene sulfonic acid; phosphoric acid group-containing monomers such as 2-hydroxyethyl acryloyl phosphate; and the like.

In addition, examples of a monomer usable for the purpose of property modification include: (N-substituted) amide-based monomers, such as (meth)acrylamide, N,N-dimethyl (meth)acrylamide, N-butyl (meth)acrylamide, N-methylol (meth)acrylamide, and N-methylolpropane (meth)acrylamide; alkylaminoalkyl-based (meth)acrylate monomers, such as aminoethyl (meth)acrylate, N,N-dimethylaminoethyl (meth)acrylate, and t-butylaminoethyl (meth) acrylate; alkoxyalkyl-based (meth)acrylate monomers, such as methoxyethyl (meth)acrylate and ethoxyethyl (meth) acrylate; succinimide-based monomers, such as N-(meth) acryloyloxymethylene succinimide, N-(meth)acryloyl-6-oxyhexamethylene succinimide, N-(meth)acryloyl-8-oxyoctamethylene succinimide, and N-acryloylmorpholine; maleimide-based monomers, such as N-cyclohexyl maleimide, N-isopropyl maleimide, N-lauryl maleimide, and N-phenyl maleimide; itaconimide-based monomers, such as N-methyl itaconimide, N-ethyl itaconimide, N-butyl itaconimide, N-octyl itaconimide, N-2-ethylhexyl itaconimide, N-cyclohexyl itaconimide, and N-lauryl itaconimide; and the like.

As the modifying monomer, it is also possible to use: a vinyl-based monomer, such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinyl-carboxylic acid amides, styrene, α-methylstyrene, and N-vinylcaprolactam; a cyanoacrylate-based monomer, such as acrylonitrile and methacrylonitrile; an epoxy group-containing acrylic monomer, such as glycidyl (meth)acrylate; a glycol-based acrylic ester monomer, such as polyethylene glycol (meth)acrylate, polypropylene glycol (meth)acrylate, methoxyethylene glycol (meth)acrylate, and methoxypolypropylene glycol (meth) acrylate; an acrylic acid ester-based monomer, such as tetrahydrofurfuryl (meth)acrylate, fluoro(meth)acrylate, silicone (meth)acrylate, and 2-methoxyethyl acrylate; and the like. Further, isoprene, butadiene, isobutylene, vinyl ether, and the like can be mentioned.

Other examples of the copolymerizable monomer include a silane-based monomer containing a silicon atom. Examples of the silane-based monomer include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, 10-acryloyloxydecyltriethoxysilane, and the like.

As the copolymerization monomer, it is also possible to use a polyfunctional monomer having two or more unsaturated double bonds of a (meth)acryloyl group, a vinyl group or the like, such as an esterified substance of (meth)acrylic acid and polyalcohol, wherein the esterified substance includes: tripropylene glycol di(meth)acrylate, tetraethylene glycol di(meth)acrylate, 1,6-hexanediol di(meth)acrylate, bisphenol A diglycidyl ether di(meth)acrylate, neopentyl glycol di(meth)acrylate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, and caprolactone-modified dipentaerythritol hexa(meth)acrylate; and polyester(meth)acrylate, epoxy(meth)acrylate and urethane(meth)acrylate obtained by adding, as the same functional group as that in the monomer component, two or more unsaturated double bonds of a (meth)acryloyl group, a vinyl group or the like, respectively, to polyester, epoxy and urethane as a backbone.

The (meth)acrylic polymer consists primarily of an alkyl (meth)acrylate in terms of a weight % with respect to all the monomers thereof, and a ratio of the copolymerization monomer in the (meth)acrylic polymer is not particularly limited but is about 0 to 20%, preferably about 0.1 to 15%, more preferably about 0.1 to 10%.

Among the above copolymerization monomers, a hydroxyl group-containing monomer and a carboxyl group-containing monomer are preferably used from the viewpoints of adhesion property and durability. The hydroxyl group-containing monomer and the carboxyl group-containing monomer can be used in combination. In the case where the pressure-sensitive adhesive composition contains a crosslinking agent, these copolymerization monomers serve as a reactive site with the cross-linking agent. The hydroxyl group-containing monomer and the carboxyl group-containing monomer are sufficiently reactive with an intermolecular crosslinking agent, so that such monomers are preferably used to enhance cohesion property and heat resistance of a resulting pressure-sensitive adhesive layer. The hydroxyl group-containing monomer is preferable from the viewpoint of reworkability and the carboxyl group-containing monomer is preferable from the viewpoint of satisfying both durability and reworkability.

In the case of containing a hydroxyl group-containing monomer as a copolymerization monomer, the proportion thereof is preferably 0.01 to 15% by weight, more preferably 0.03 to 10% by weight, even more preferably 0.05 to 7% by weight. In the case of containing a carboxyl group-containing monomer as a copolymerization monomer, the proportion thereof is preferably 0.05 to 10% by weight, more preferably 0.1 to 8% by weight, even more preferably 0.2 to 6% by weight.

Generally, as the (meth)acrylic polymer for use in the present invention, a polymer having a weight average molecular weight of 500,000 to 3,000,000 is suitably used. Considering durability, particularly, heat resistance, it is preferable to use the (meth)acrylic polymer having a weight average molecular weight of preferably 700,000 to 2,700,000, more preferably 800,000 to 2,500,000. When the weight average molecular weight is smaller than 500,000, such a molecular weight is not preferable from the viewpoint of heat resistance of the (meth)acrylic polymer. In addition, when the weight average molecular weight is larger than 3,000,000, a large amount of diluting solvent is necessary for adjusting the viscosity for coating, which is not preferable because the cost is increased. The weight average molecular weight means a value calculated by polystyrene conversion as measured by GPC (gel permeation chromatography).

As regards production of the (meth)acrylic polymer, it is possible to selectively use one of conventional production methods such as solution polymerization, bulk polymerization, emulsion polymerization and various radical polymerizations, on a case-by-case basis. The resulting (meth)acrylic polymer may be any type of copolymers such as a random copolymer, a block copolymer or a graft copolymer.

As the antistatic agent used for forming the first pressure-sensitive adhesive layer, among the above examples an ionic compound is preferable in terms of compatibility with the base polymer and transparency of the pressure-sensitive adhesive layer. In particular, when an acrylic pressure-sensitive adhesive containing a (meth)acrylic polymer as a base polymer is used, it is preferable to use an ionic compound. As the ionic compound, an ionic liquid is preferable from the viewpoint of antistatic function.

The amounts of the pressure-sensitive adhesive and the antistatic agent to be used are controlled so that the surface resistance value of the obtained first pressure sensitive adhesive layer is $1\times10^8$ to $1\times10^{12}\Omega/\square$, depending on the type thereof. For example, the antistatic agent (for example, in the case of an ionic compound) is preferably used in an amount of 0.05 to 20 parts by weight per 100 parts by weight of a base polymer of a pressure-sensitive adhesive (for example, a (meth)acrylic polymer). Use of the antistatic agent in an amount of 0.05 parts by weight or more is preferable for improving the antistatic performance. Furthermore, the antistatic agent (B) is used in an amount of preferably 0.1 parts by weight or more, more preferably 0.5 parts by weight or more. For satisfying durability, the antistatic agent (B) is used in an amount of preferably 20 parts by weight or less, further preferably 10 parts by weight or less.

The pressure-sensitive adhesive composition for forming the first pressure-sensitive adhesive layer can contain a crosslinking agent corresponding to the base polymer. For example, when a (meth)acrylic polymer is used as the base polymer, an organic crosslinking agent or a polyfunctional metal chelate can be used as the crosslinking agent. Examples of the organic crosslinking agent include isocyanate-based crosslinking agents, peroxide-based crosslinking agents, epoxy-based crosslinking agents, imine-based crosslinking agents and the like. The polyfunctional metal chelate is one in which a polyvalent metal is covalently or coordinately bonded to an organic compound. As the polyvalent metal atom, there can be mentioned, for example, Al, Cr, Zr, Co, Cu, Fe, Ni, V, Zn, In, Ca, Mg, Mn, Y, Ce, Sr, Ba, Mo, La, Sn, Ti and the like. For example, the covalently- or coordinately-bonded atom in the organic compound may be an oxygen atom. Examples of the organic compound include alkyl esters, alcohol compounds, carboxylic acid compounds, ether compounds, ketone compounds, and the like.

The amount of the crosslinking agent used is preferably 3 parts by weight or less, more preferably 0.01 to 3 parts by weight, even more preferably 0.02 to 2 parts by weight, still even more preferably 0.03 to 1 part by weight, per 100 parts by weight of the (meth)acrylic polymer.

The pressure-sensitive adhesive composition for forming the first pressure-sensitive adhesive layer may contain a silane coupling agent and other additives. For example, polyether compounds of polyalkylene glycol such as polypropylene glycol, powders such as colorants and pigments, dyes, surfactants, plasticizers, tackifiers, surface lubricants, leveling agents, softeners, antioxidants, anti-aging agents, light stabilizers, ultraviolet absorbers, polymerization inhibitors, inorganic or organic fillers, metal powder, particulates, foil-like materials, and the like can be appropriately added depending on the applications to be used. In addition, a redox system in which a reducing agent is added may be adopted within a controllable range. These additives are preferably used in an amount of 5 parts by weight or less, more preferably 3 parts by weight or less, even more preferably 1 part by weight or less, per 100 parts by weight of the (meth)acrylic polymer.

<Surface-Treated Layer>

A surface-treated layer can be provided on the side where an anchor film of a first polarizing film is not provided. The surface-treated layer can be provided on a transparent protective film used for the first polarizing film or separately from the transparent protective film. As the surface-treated layer, a hard coat layer, an antiglare treatment layer, an antireflection layer, a sticking prevention layer, and the like can be provided.

The surface treatment layer is preferably a hard coat layer. As a material for forming the hard coat layer, for example, a thermoplastic resin or a material which is cured by heat or radiation can be used. Examples of such materials include thermosetting resins and radiation-curable resins such as ultraviolet curable resins and electron beam curable resins. Among them, ultraviolet curable resins are preferred, which can efficiently form a cured resin layer by a simple processing operation at the time of curing by ultraviolet radiation. Examples of such curable resins include a variety of resins such as polyester resins, acrylic resins, urethane resins, amide resins, silicone resins, epoxy resins, and melamine resins, including monomers, oligomers, and polymers thereof. In particular, radiation curable resins, specifically ultraviolet curable resins are preferred, because of high processing speed and less thermal damage to the substrate. For example, an ultraviolet curable resin having an ultraviolet-polymerizable functional group, particularly having two or more ultraviolet-polymerizable functional groups, specifically including an acrylic monomer or oligomer component with 3 to 6 ultraviolet-polymerizable functional groups is preferably used. The ultraviolet curable resin may be mixed with a photopolymerization initiator.

In addition, as the surface treatment layer, an antiglare treatment layer or an antireflection layer can be provided for the purpose of improving visibility. An antiglare layer and an antireflection layer may be provided on the hard coat layer. The constituent material of the antiglare treatment layer is not particularly limited, and for example, a radiation curable resin, a thermosetting resin, a thermoplastic resin, or the like can be used. As the antireflection layer, titanium oxide, zirconium oxide, silicon oxide, magnesium fluoride or the like is used. Multiple layers can be provided for the antireflection layer. Other examples of the surface treatment layer include a sticking prevention layer and the like.

Conductivity can be imparted to the surface treatment layer by containing an antistatic agent. As the antistatic agent, those exemplified above can be used.

<Surface Protective Film>

As a surface protective film that can be provided on the surface-treated layer (the first polarizing film is a target in the case where the first polarizing film does not comprise a surface-treated layer; the same applies hereinafter), one in which a pressure-sensitive adhesive layer is provided on at least one surface of a support film can be used. The pressure-sensitive adhesive layer of the surface protective film may contain a light release agent, an antistatic agent, and the like. In the case where the pressure-sensitive adhesive layer of the surface protective film contains an antistatic agent, the surface protective film is laminated to the surface-treated layer and thereafter peeled off, whereby a conductive function can be imparted to the surface-treated layer surface in which an antistatic agent is not contained, so that the surface-treated layer can contain an antistatic agent. The same antistatic agent as above can be used. In addition, in order to impart a conductive function to the surface-treated layer surface by peeling of the surface protective film, it is preferable to use a light release agent together with the antistatic agent in the pressure-sensitive adhesive layer of the surface protective film. Examples of the light release agent include polyorganosiloxane and the like. How much conductive function is to be imparted to the surface-treated layer surface is determined by appropriately adjusting the usage amount of the antistatic agent and the light release agent. The surface protective film can also be provided on the surface of the second polarizing film described later.

<Other Layers>

The pressure-sensitive adhesive layer attached polarizing film according to the present invention may be provided with, in addition to each layer described above, on the surface of the first polarizing film on the side where the anchor layer can be provided, an easy adhesion layer or various kinds of easy adhesion treatment such as corona treatment and plasma treatment can be applied.

Hereinafter, an in-cell type liquid crystal cell B and an in-cell type liquid crystal panel C will be described.

(In-Cell Type Liquid Crystal Cell B)

As shown in FIGS. 2 to 6, an in-cell type liquid crystal cell B includes a liquid crystal layer 20 containing liquid crystal molecules homogeneously aligned in the absence of an electric field, a first transparent substrate 41 and a second transparent substrate 42 sandwiching the liquid crystal layer 20 from both surfaces. In addition, a touch sensing electrode unit related to a touch sensor and a touch driving function is provided between the first transparent substrate 41 and the second transparent substrate 42.

Figure 2:
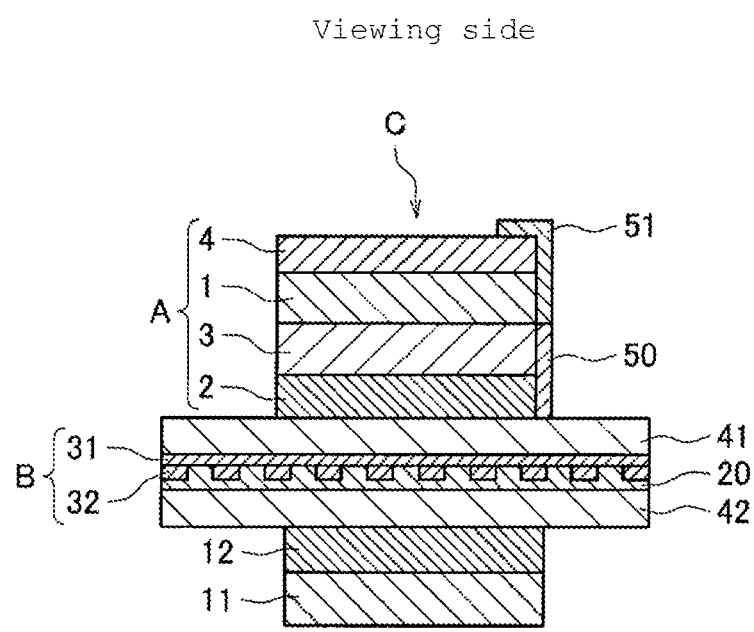
FIG. 2 is a cross-sectional view showing an example of an in-cell type liquid crystal panel of the present invention.
Figure 3:
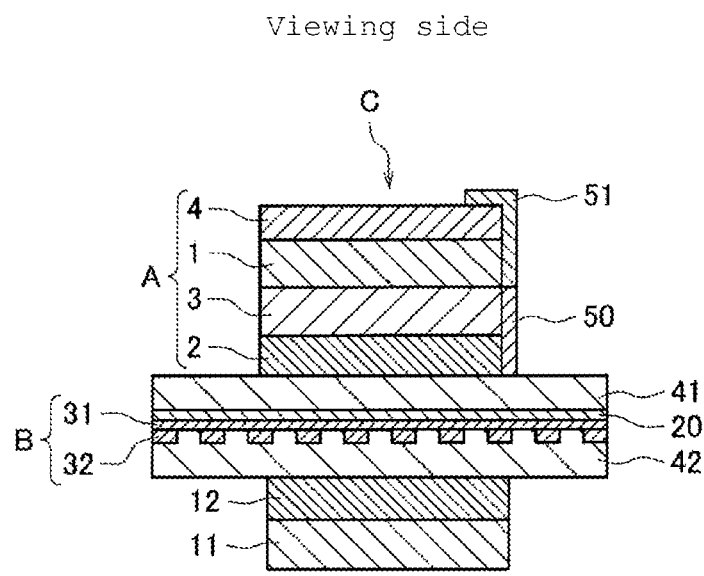
FIG. 3 is a cross-sectional view showing an example of an in-cell type liquid crystal panel of the present invention.
Figure 6:
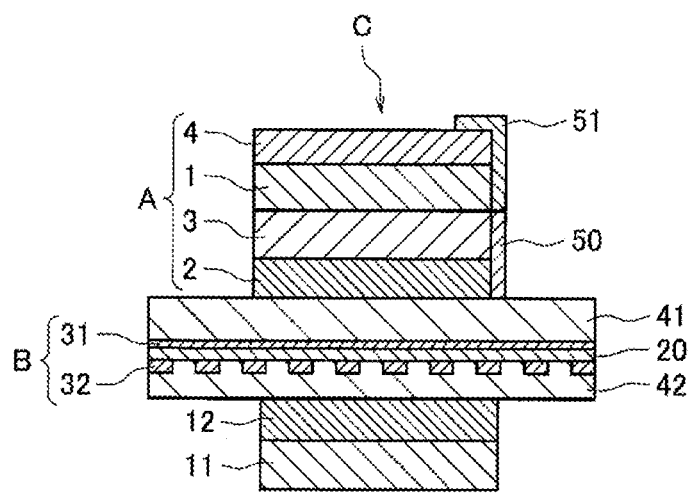
FIG. 6 is a cross-sectional view showing an example of an in-cell type liquid crystal panel of the present invention.

As shown in FIGS. 2, 3, and 6, the touch sensing electrode unit can be formed by a touch sensor electrode 31 and a touch driving electrode 32. The touch sensor electrode referred to herein means a touch detection (reception) electrode. The touch sensor electrode 31 and the touch driving electrode 32 can be independently formed in various patterns. For example, when the in-cell type liquid crystal cell B is a flat surface, it can be disposed in a pattern intersecting at right angles in a form independently provided in an X axis direction and a Y axis direction, respectively. In FIGS. 2, 3, and 6, the touch sensor electrode 31 is disposed on the side (viewing side) of the first transparent substrate 41 with respect to the touch driving electrode 32, but contrary to the above, the touch driving electrode 32 can be disposed on the side of the first transparent substrate 41 (viewing side) with respect to the touch sensor electrode 31.

Figure 4:
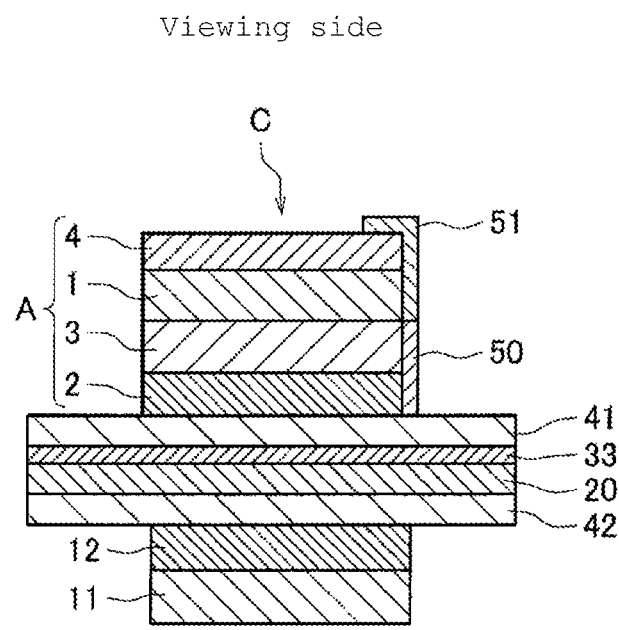
FIG. 4 is a cross-sectional view showing an example of an in-cell type liquid crystal panel of the present invention.
Figure 5:
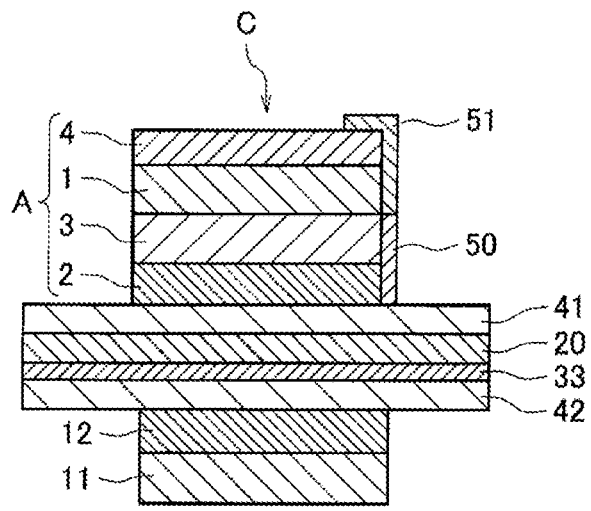
FIG. 5 is a cross-sectional view showing an example of an in-cell type liquid crystal panel of the present invention.

On the other hand, as shown in FIGS. 4 and 5, an electrode 33 integrally formed with the touch sensor electrode and the touch driving electrode can be used in the touch sensing electrode unit.

The touch sensing electrode unit may be disposed between the liquid crystal layer 20 and the first transparent substrate 41 or the second transparent substrate 42. FIGS. 2 and 4 show a case where the touch sensing electrode unit is disposed between the liquid crystal layer 20 and the first transparent substrate 41 (on the viewing side of the liquid crystal layer 20). FIGS. 3 and 5 show a case where the touch sensing electrode unit is disposed between the liquid crystal layer 20 and the second transparent substrate 42 (on the backlight side of the liquid crystal layer 20).

As shown in FIG. 6, the touch sensing electrode unit is able to comprise the touch sensor electrode 31 between the liquid crystal layer 20 and the first transparent substrate 41, and comprise the touch driving electrode 32 between the liquid crystal layer 20 and the second transparent substrate 42.

Note that a driving electrode in the touch sensing electrode unit (the touch driving electrode 32, the electrode 33 integrally formed with the touch sensor electrode and the touch driving electrode) can also serve as a common electrode for controlling the liquid crystal layer 20.

As the liquid crystal layer 20 used for the in-cell type liquid crystal cell B, a liquid crystal layer containing liquid crystal molecules homogeneously aligned in the absence of an electric field is used. As the liquid crystal layer 20, for example, an IPS type liquid crystal layer is suitably used. Besides, for the liquid crystal layer 20, for example, any type of liquid crystal layer, such as a TN type, an STN type, a $\pi$ type, a VA type or the like, can be used. The thickness of the liquid crystal layer 20 is, for example, about 1.5 μm to 4 μm.

As described above, the in-cell type liquid crystal cell B comprises the touch sensing electrode unit related to the touch sensor and the touch driving function in the liquid crystal cell and does not comprise the touch sensor electrode outside the liquid crystal cell. That is, a conductive layer (the surface resistance value is $1 \times 10^{13} \Omega/\square$ or less) is not provided on the viewing side (the liquid crystal cell side of the in-cell type liquid crystal panel C with respect to the first pressure-sensitive adhesive layer 2) from the first transparent substrate 41 of the in-cell liquid crystal cell B. Incidentally, in the in-cell type liquid crystal panel C shown in FIGS. 2 to 6, the order of each configuration is shown, but the in-cell type liquid crystal panel C can comprise other configurations as appropriate. A color filter substrate can be provided on the liquid crystal cell (the first transparent substrate 41).

Examples of the material for forming the transparent substrate include glass or polymer film. Examples of the polymer film include polyethylene terephthalate, polycycloolefin, polycarbonate, and the like. When the transparent substrate is formed of glass, its thickness is, for example, about 0.1 mm to 1 mm. When the transparent substrate is formed of a polymer film, its thickness is, for example, about 10 μm to 200 μm. The transparent substrate may comprise an easy adhesion layer or a hard coat layer on its surface.

The touch sensing electrode unit is formed as a transparent conductive layer from the touch sensor electrode 31 (electrostatic capacitance sensor) and the touch driving electrode 32, or from the electrode 33 integrally formed with the touch sensor electrode and the touch driving electrode.

The constituent material of the transparent conductive layer is not particularly limited, and examples thereof include metals such as gold, silver, copper, platinum, palladium, aluminum, nickel, chromium, titanium, iron, cobalt, tin, magnesium, and tungsten, and alloys thereof. Examples of the constituent material of the transparent conductive layer include metal oxides such as oxides of metals (e.g. indium, tin, zinc, gallium, antimony, zirconium, and cadmium), specifically including indium oxide, tin oxide, titanium oxide, cadmium oxide, and a mixture of these metal oxides. Other metal compounds such as copper iodide and the like are used. The metal oxide may further contain an oxide of the metal atom shown in the above group, if necessary. For example, indium oxide (ITO) containing tin oxide, tin oxide containing antimony, etc. are preferably used, and ITO is particularly preferably used. The ITO preferably contains 80 to 99% by weight of indium oxide and 1 to 20% by weight of tin oxide.

The electrode (the touch sensor electrode 31, the touch driving electrode 32, and the electrode 33 formed integrally with the touch sensor electrode and the touch driving electrode) relating to the touch sensing electrode unit can be formed as a transparent electrode pattern usually on the inside of the first transparent substrate 41 and/or the second transparent substrate 42 (on the side of the liquid crystal layer 20 in the in-cell type liquid crystal cell B) by a conventional method. The transparent electrode pattern is usually electrically connected to a routing line (not shown) formed at an end part of the transparent substrate, and the routing line is connected to a controller IC (not shown). The shape of the transparent electrode pattern may be any shape other than a comb shape, such as a stripe shape or a rhombic shape, depending on the application. The height of the transparent electrode pattern is, for example, 10 nm to 100 nm and the width is 0.1 mm to 5 mm.

(In-Cell Type Liquid Crystal Panel C)

As shown in FIGS. 2 to 6, the in-cell type liquid crystal panel C of the present invention is able to comprise a pressure-sensitive adhesive layer attached polarizing film A on the viewing side of an in-cell type liquid crystal cell B and a second polarizing film 11 on the opposite side thereof. The pressure-sensitive adhesive layer attached polarizing film A is disposed on the side of the first transparent substrate 41 of the in-cell type liquid crystal cell B with the first pressure-sensitive adhesive layer 2 interposed therebetween without a conductive layer interposed therebetween. On the other hand, on the side of the second transparent substrate 42 of the in-cell type liquid crystal cell B, the second polarizing film 11 is disposed with the second pressure-sensitive adhesive layer 12 interposed therebetween. The first polarizing film 1 and the second polarizing film 11 in the pressure-sensitive adhesive layer attached polarizing film A are disposed so that the transmission axes (or absorption axes) of the respective polarizers are orthogonal to each other on both sides of the liquid crystal layer 20.

As the second polarizing film 11, those described for the first polarizing film 1 can be used. The second polarizing film 11 to be used may be the same as or different from the first polarizing film 1.

For forming the second pressure-sensitive adhesive layer 12, the pressure-sensitive adhesive described for the first pressure-sensitive adhesive layer 2 can be used. The pressure-sensitive adhesive used for forming the second pressure-sensitive adhesive layer 12 may be the same as or different from the first pressure-sensitive adhesive layer 2. The thickness of the second pressure-sensitive adhesive layer 12 is not particularly limited, and is, for example, about 1 to 100 µm. Such thickness is preferably 2 to 50 µm, more preferably 2 to 40 µm, and still more preferably 5 to 35 µm.

In the in-cell type liquid crystal panel C, a conduction structure 50 can be provided on the side surfaces of the anchor layer 3 and the first pressure-sensitive adhesive layer 2 of the pressure-sensitive adhesive layer attached polarizing film A. The conduction structure 50 may be provided on the entire side surfaces of the anchor layer 3 and the first pressure-sensitive adhesive layer 2 or may be provided in a part thereof. In the case where the conduction structure is provided in a part, in order to ensure conduction on the side surface, it is preferable that the conduction structure be provided in a proportion of 1 area % or more, preferably 3 area % or more of the area of the side surface. In addition to the above, as shown in FIG. 2, a conduction structure 51 can be provided on the side surface of the first polarizing film 1.

It is possible to suppress the occurrence of static electricity by connecting the potential to the other suitable portion from the side surface of the anchor layer 3 and the first pressure-sensitive adhesive layer 2 by the conduction structure 50. As a material for forming the conduction structures 50 and 51, for example, a conductive paste such as silver paste, gold paste or other metal paste can be mentioned, and other conductive adhesives or any other suitable conductive materials can be used. The conduction structure 50 can also be formed in a linear shape extending from the side surface of the anchor layer 3 and the first pressure-sensitive adhesive layer 2. The conduction structure 51 can also be formed in the same linear shape.

In addition, the first polarizing film 1 disposed on the viewing side of the liquid crystal layer 20, and the second polarizing film 11 disposed on the side opposite to the viewing side of the liquid crystal layer 20 can be used by laminating other optical films, depending on the suitability of each arrangement position. As the other optical film which may be used for forming a liquid crystal display device or the like, there are exemplified those capable of forming an optical film layer, such as a reflection plate, an anti-transmission plate, a retardation film (including wavelength plates such as ½ and ¼), a visual compensation film, and a brightness enhancement film. These can be used in one layer or in two or more layers.

(Liquid Crystal Display Device)

The liquid crystal display device with a built-in touch sensing function using the in-cell type liquid crystal panel C of the present invention can use appropriately members that form a liquid crystal display device, such as those using a backlight or a reflection plate for a lighting system.

EXAMPLES

Although the present invention will be described in detail below, based on Production Examples and Examples, it should be understood that the present invention is not limited to such Examples. The parts and percentages in each Example are on a weight basis. Room temperature standing conditions below are all 23° C. and 65% RH unless otherwise specified.

<Measurement of Weight Average Molecular Weight of (Meth)Acrylic Polymer>

The weight average molecular weight (Mw) of the (meth) acrylic polymer was measured by GPC (gel permeation chromatography). The ratio Mw/Mn was also measured in the same manner.

Analyzer: HLC-8120 GPC, manufactured by Tosoh Corporation
Column: G7000H$_{XL}$+GMH$_{XL}$+GMH$_{XL}$, manufactured by Tosoh Corporation
Column size: 7.8 mm φ×30 cm each in total 90 cm
Column temperature: 40° C.
Flow rate: 0.8 mL/min
Injection volume: 100 µL
Eluent: Tetrahydrofuran
Detector: Differential refractometer (RI)
Standard sample: Polystyrene (Production of Polarizing Film)

An 80 µm-thick polyvinyl alcohol film was stretched between rolls each having different speed ratios, at a stretching ratio of 3 times, while being dyed in a 0.3% iodine solution at 30° C. for 1 minute. Then, the stretched film was further stretched to attain a total stretching ratio of 6 times while being immersed in an aqueous solution containing 4% boric acid and 10% potassium iodide at 60° C. for 0.5 minutes. Subsequently, the stretched film was washed by immersing it in an aqueous solution containing 1.5% potassium iodide at 30° C. for 10 seconds and then dried at 50° C. for 4 minutes to obtain a 30 µm-thick polarizer. A polarizing film was prepared by laminating a saponified triacetyl cellulose film having a thickness of 80 µm on both surfaces of the polarizer with a polyvinyl alcohol-based adhesive.

<Formation of Surface-Treated Layer>

A hard coating resin composition (coating solution) was prepared by mixing 100 parts of an ultraviolet curable acrylic resin (UNIDIC 17-806, manufactured by Dainippon Ink and Chemicals, Incorporated), 3 parts of a photopolymerization initiator (IRGACURE 184, manufactured by Ciba Specialty Chemicals, Inc.) and 100 parts of toluene. The coating solution was coated on one surface of the polarizing film obtained above with a wire bar and dried by heating at 80° C. for 1 minute to form a coating film. Subsequently, the coating film was irradiated with 300 mJ/cm$^2$ ultraviolet rays using a metal halide lamp and cured to form a hard coat layer having a film thickness of 5 µm.

(Preparation of Forming Material of Anchor Layer)

A solution containing 10 to 50% by weight of a thiophene-based polymer (8.6 parts, trade name: DENATRON P-580 W, manufactured by Nagase ChemteX Corporation) as a solid content, 1 part of a solution containing an oxazoline group-containing acrylic polymer (trade name: EPOCROS WS-700, manufactured by Nippon Shokubai Co., Ltd.) and 90.4 parts of water were mixed to prepare a coating solution for forming an anchor layer having a solid content concentration of 0.5% by weight. The obtained coating solution for forming an anchor layer contained 0.04% by weight of the polythiophene-based polymer and 0.25% by weight of the oxazoline group-containing acrylic polymer.

(Formation of Anchor Layer)

The coating solution for forming an anchor layer was applied to one surface (side having no hard coat layer) of the polarizing film such that the thickness after drying became the thickness shown in Table 1 and dried at 80° C. for 2 minutes to form an anchor layer. In the obtained anchor layer, the thiophene-based polymer and the oxazoline group-containing acrylic polymer were contained in 8% by weight and 50% by weight, respectively.

(Preparation of Acrylic Polymer)

A monomer mixture of 74.8 parts of butyl acrylate, 23 parts of phenoxyethyl acrylate, 0.5 parts of N-vinyl-2-pyrrolidone (NVP), 0.3 parts of acrylic acid, and 0.4 parts of 4-hydroxybutyl acrylate was charged into a four-necked flask equipped with a stirring blade, a thermometer, a nitrogen gas inlet tube and a condenser. Further, 0.1 parts of 2,2'-azobisisobutyronitrile as a polymerization initiator together with 100 parts of ethyl acetate were added to 100 parts (solid content) of the above monomer mixture, and nitrogen gas was introduced thereto with gentle stirring. After purging the inside of the flask with nitrogen gas, a polymerization reaction was carried out for 8 hours while keeping the liquid temperature in the flask at around 55° C. to prepare a solution of an acrylic polymer having a weight average molecular weight (Mw) of 1,600,000 and a ratio Mw/Mn of 3.7.

(Preparation of Pressure-Sensitive Adhesive Composition)

Lithium bis(trifluoromethanesulfonyl)imide manufactured by Mitsubishi Materials Corporation was blended as an ionic compound in the amount shown in Table 1 with respect to 100 parts of the solid content of the acrylic polymer solution obtained above. Further, 0.1 parts of an isocyanate crosslinking agent (TAKENATE D 160N, trimethylolpropane hexamethylene diisocyanate, manufactured by Mitsui Chemicals, Inc.), 0.3 parts of benzoyl peroxide (NYPER BMT, manufactured by NOF CORPORATION), and 0.2 parts of γ-glycidoxypropylmethoxysilane (KBM-403, manufactured by Shin-Etsu Chemical Co., Ltd.) were blended thereto to prepare a solution of an acrylic pressure-sensitive adhesive composition.

(Formation of Pressure-Sensitive Adhesive Layer)

Next, the solution of the acrylic pressure-sensitive adhesive composition was applied onto one surface of a polyethylene terephthalate film treated with a silicone-based release agent (separator film: MRF 38, manufactured by Mitsubishi Chemical Polyester Film Corp.) such that the pressure-sensitive adhesive layer after drying has a thickness shown in Table 1, and dried at 155° C. for 1 minute to form a pressure-sensitive adhesive layer on the surface of the separator film. The pressure-sensitive adhesive layer was transferred to a polarizing film on which an anchor layer was formed or to a polarizing film on which no anchor layer was formed.

Examples 1 to 11 and Comparative Examples 1 to 4

An anchor layer and a pressure-sensitive adhesive layer were sequentially formed on one surface (side on which no hard coat layer was provided) of the polarizing film obtained above by the combination shown in Table 1 to prepare a pressure-sensitive adhesive layer attached polarizing film.

In Example 11, an antistatic layer was provided by laminating the following surface protective film on the hard coat layer side of the obtained pressure-sensitive adhesive layer attached polarizing film and peeling off the surface protective film.

<Preparation of Surface Protective Film>

A (meth)acrylic polymer (A) and a pressure-sensitive adhesive solution were prepared as shown below, and a surface protective film was prepared by the following method using the pressure-sensitive adhesive solution.

[Preparation of (Meth)Acrylic Polymer (A)]

A four-necked flask equipped with a stirring blade, a thermometer, a nitrogen gas inlet tube and a condenser was charged with 100 parts of 2-ethylhexyl acrylate (2EHA), 10 parts of 4-hydroxybutyl acrylate (4HBA), 0.02 parts of acrylic acid (AA), 0.2 parts of 2,2'-azobisisobutyronitrile as a polymerization initiator, and 157 parts of ethyl acetate, and nitrogen gas was introduced thereto with gentle stirring. A polymerization reaction was carried out for 6 hours while keeping the liquid temperature in the flask at around 65° C. to prepare a solution (40% by weight) of a (meth)acrylic polymer (A) having a weight average molecular weight of 540,000 and a glass transition temperature (Tg) of −67° C.

[Preparation of Pressure-Sensitive Adhesive Solution]

The (meth)acrylic polymer (A) solution (40%) was diluted to 20% with ethyl acetate. To 500 parts (solid content 100 parts) of the diluted solution were added 2 parts (solid content: 0.2 parts) of an organopolysiloxane having an oxyalkylene chain as a silicone component (KF-353, manufactured by Shin-Etsu Chemical Co., Ltd.) diluted with ethyl acetate to 10%, 15 parts (solid content: 0.15 parts) of a solution prepared by diluting lithium bis (trifluoromethanesulfonyl)imide ($LiN(CF_3SO_2)_2$:LiTFSI, manufactured by Tokyo Chemical Industry Co., Ltd.) with ethyl acetate as an antistatic agent, i.e. an alkali metal salt (ionic compound) to 1%, 1.75 parts by weight (solid content: 1.75 parts by weight) of isocyanurate of hexamethylene diisocyanate (CORONATE HX, manufactured by Nippon Polyurethane Industry Co., Ltd.,) as a crosslinking agent that is a trifunctional isocyanate compound, 0.3 parts (solid content: 0.3 parts) of 1,3-bis(isocyanatomethyl) cyclohexane (TAKENATE 600, manufactured by Mitsui Chemicals, Inc.) that is a bifunctional isocyanate compound, and 2 parts (solid content: 0.02 parts) of dibutyltin dilaurate (1% ethyl acetate solution) as a crosslinking catalyst, and the resulting mixture was stirred to prepare an acrylic pressure-sensitive adhesive solution.

[Preparation of Antistatic-Treated Film]

An antistatic agent solution was prepared by diluting 10 parts of an antistatic agent (MICRO-SOLVER RMd-142 containing tin oxide and a polyester resin as main components, manufactured by Solvex Inc.) with a mixed solvent consisting of 30 parts of water and 70 parts of methanol.

The obtained antistatic agent solution was applied onto a polyethylene terephthalate (PET) film (thickness: 38 μm) using a Mayer bar and dried at 130° C. for 1 minute to remove the solvent to obtain an antistatic layer (thickness: 0.2 μm), thereby to prepare an antistatic-treated film.

[Preparation of Surface Protective Film (Pressure-Sensitive Adhesive Sheet)]

The above acrylic pressure-sensitive adhesive solution was applied to the surface opposite to the antistatic-treated surface of the antistatic-treated film and heated at 130° C. for 2 minutes to form a pressure-sensitive adhesive layer having a thickness of 15 μm. Subsequently, a silicone-treated surface of a polyethylene terephthalate film (thickness: 25 μm) that had been subjected to a silicone treatment on one surface was laminated on the surface of the pressure-sensitive adhesive layer to prepare a surface protective film.

In Comparative Example 1, no conductive polymer was blended in the coating solution for forming an anchor layer.

In Comparative Examples 2 and 3, no ionic compound was blended in the preparation of the pressure-sensitive adhesive composition.

Formation of the anchor layer of Comparative Example 4 was carried out as follows.

100 g of Dipentaerythritol hexaacrylate, 10 g of a photoinitiator (IRGACURE 184, manufactured by Ciba Specialty Chemicals), 100 g of methyl alcohol, and 100 g of propylene glycol monomethyl ether (PGM) were thoroughly blended and mixed with a stirrer for about one hour so as to mix uniformly. Next, while slowly dropping 40 g of an AZO dispersion solution into the produced stirring solution, stirring was continued for about 1 hour so as to be thoroughly mixed to prepare a coating solution. Thereafter, the produced coating solution was coated on a triacetyl cellulose film using a bar coater so as to have a film thickness of 4 μm after curing, and the coated film was dried in a 60° C. oven for 2 minutes. Next, the dried film was irradiated with a medium-pressure mercury lamp (UV source, amount of light: 1 J/cm$^2$) and cured to form an anchor layer.

The following evaluations were carried out on the pressure-sensitive adhesive layer attached polarizing films obtained in the above Examples and Comparative Examples. The evaluation results are shown in Table 1.

<Surface Resistance Value (Ω/□): Conductivity>

The surface resistance values of the anchor layer, the pressure-sensitive adhesive layer, and the surface-treated layer were measured.

The surface resistance value of the anchor layer was measured on the anchor layer side surface of the polarizing film provided with an anchor layer before forming the pressure sensitive adhesive layer.

The surface resistance value of the pressure-sensitive adhesive layer was measured on the surface of the pressure-sensitive adhesive layer formed on the separator film.

The surface resistance value of the surface-treated layer was measured for the surface-treated layer of the pressure-sensitive adhesive layer attached polarizing film. In Example 11, the surface resistance value of the surface-treated layer was measured after laminating a surface protective film to the pressure-sensitive adhesive layer attached polarizing film and thereafter peeling off the surface protective film.

After peeling off the separator film from the pressure-sensitive adhesive layer attached polarizing film, the surface resistance value of the surface of the pressure-sensitive adhesive layer was measured. The measurement was carried out using MCP-HT 450 manufactured by Mitsubishi Chemical Analytech Co., Ltd. The measurement results are listed in the uppermost part in the cell of Table 1 in which other evaluation items are described.

<ESD Test>

The separator film was peeled off from the pressure-sensitive adhesive layer attached polarizing film and then laminated to the viewing side of the in-cell type liquid crystal cell as shown in FIG. 2 or FIG. 3. Next, a silver paste having a width of 5 mm was applied to the side surface portion of the polarizing film thus laminated so as to cover each side surface portion of the hard coat layer, the polarizing film, the anchor layer, and the pressure-sensitive adhesive layer and connected to a ground electrode from the outside. The liquid crystal display panel was set on the backlight device, and an electrostatic discharge gun was shot onto the polarizing film surface on the viewing side at an applied voltage of 10 kV, and the time until the disappearance of the white voids due to electricity was measured, and judgement was made according to the following criteria. However, in Example 1, formation of a conductive structure using a silver paste was not carried out.

(Evaluation Criteria)

⊙⊙: Within 1 second
⊙: Within 3 seconds
○: More than 3 seconds and within 5 seconds
Δ: More than 5 seconds and within 20 seconds
x: More than 20 seconds <TSP Sensitivity>

A lead wiring (not shown) at the peripheral portion of a transparent electrode pattern inside an in-cell type liquid crystal cell was connected to a controller IC (not shown), thereby to fabricate a liquid crystal display device with a built-in touch sensing function. In a state where an input display device of the liquid crystal display device with a built-in touch sensing function is used, visual observation was carried out to check the presence or absence of malfunction.

○: No malfunction was observed.
x: Malfunction was observed.

<TSP Sensitivity Under Humidification>

The TSP sensitivity was confirmed in a humidified atmosphere after the liquid crystal display device with a built-in touch sensing function was placed in a humidified atmosphere at 60° C. and 90% RH for 120 hours.

<Humidification Durability Test>

The pressure-sensitive adhesive layer attached polarizing film cut into a 15-inch size was used as a sample. The sample was stuck to a 0.7 mm-thick alkali-free glass (EG-XG, manufactured by Corning Incorporated) using a laminator.

Subsequently, the sample was autoclaved at 50° C. and 0.5 MPa for 15 minutes to completely adhere the sample to the alkali-free glass. The sample subjected to such treatment was treated for 500 hours in an atmosphere of 60° C./90% RH and then the appearance between the polarizing film and the alkali-free glass was visually evaluated according to the following criteria.

(Evaluation Criteria)

⊙: In the sample, there is no change at all in appearance such as foaming, peeling or the like.
○: Slight peeling or foaming occurs at the end portion of the sample, but there is no problem in practical use.
Δ: Peeling or foaming occurs at the end portion of the sample, but there is no problem in practical use except for special applications.
x: Significant peeling occurs at the end portion of the sample, causing problems in practical use.

TABLE 1

| | | Pressure-sensitive adhesive layer | | | | Anchor layer | | | Surface-treated layer (hard coat layer) |
| --- | --- | --- | --- | --- | --- | --- | --- | --- | --- |
| | | Thickness (μm) | Type of ionic compound | Blending amount of ionic compound (parts by weight) | Surface resistance value (Ω/□) | Thickness (μm) | Conductive polymer | Surface resistance value (Ω/□) | Surface resistance value (Ω/□) |
| Examples | 1 | 23 | Li-TFSI | 0.5 | $2.5 \times 10^{11}$ | 0.04 | Polythiophene | $5.3 \times 10^9$ | Unmeasurable ($1.0 \times 10^{14}$ or more) |

TABLE 1-continued

|  |  |  |  |  |  |  |  |  |  |
|---|---|---|---|---|---|---|---|---|---|
|  | 2 | 23 | Li-TFSI | 0.5 | $2.5 \times 10^{11}$ | 0.04 | Polythiophene | $5.3 \times 10^{9}$ | Unmeasurable ($1.0 \times 10^{14}$ or more) |
|  | 3 | 23 | Li-TFSI | 1 | $4.3 \times 10^{10}$ | 0.04 | Polythiophene | $5.3 \times 10^{9}$ | Unmeasurable ($1.0 \times 10^{14}$ or more) |
|  | 4 | 23 | Li-TFSI | 10 | $1.9 \times 10^{9}$ | 0.04 | Polythiophene | $5.3 \times 10^{9}$ | Unmeasurable ($1.0 \times 10^{14}$ or more) |
|  | 5 | 23 | Li-TFSI | 20 | $7.6 \times 10^{8}$ | 0.04 | Polythiophene | $5.3 \times 10^{9}$ | Unmeasurable ($1.0 \times 10^{14}$ or more) |
|  | 6 | 23 | Li-TFSI | 1 | $4.3 \times 10^{10}$ | 0.06 | Polythiophene | $4.8 \times 10^{8}$ | Unmeasurable ($1.0 \times 10^{14}$ or more) |
|  | 7 | 23 | Li-TFSI | 1 | $4.3 \times 10^{10}$ | 0.03 | Polythiophene | $2.4 \times 10^{10}$ | Unmeasurable ($1.0 \times 10^{14}$ or more) |
|  | 8 | 23 | Li-TFSI | 1 | $4.3 \times 10^{10}$ | 0.02 | Polythiophene | $1.8 \times 10^{11}$ | Unmeasurable ($1.0 \times 10^{14}$ or more) |
|  | 9 | 23 | Li-TFSI | 10 | $1.9 \times 10^{9}$ | 0.04 | Polythiophene | $5.3 \times 10^{9}$ | Unmeasurable ($1.0 \times 10^{14}$ or more) |
|  | 10 | 23 | Li-TFSI | 1 | $4.3 \times 10^{10}$ | 0.06 | Polythiophene | $4.8 \times 10^{8}$ | Unmeasurable ($1.0 \times 10^{14}$ or more) |
|  | 11 | 23 | Li-TFSI | 1 | $4.3 \times 10^{10}$ | 0.06 | Polythiophene | $4.8 \times 10^{8}$ | $8.3 \times 10^{11}$ |
| Comparative examples | 1 | 23 | Li-TFSI | 40 | $8.2 \times 10^{7}$ | 0.03 | — | Unmeasurable ($1.0 \times 10^{14}$ or more) | Unmeasurable ($1.0 \times 10^{14}$ or more) |
|  | 2 | 23 | — | 0 | Unmeasurable ($1.0 \times 10^{14}$ or more) | 0.04 | Polythiophene | $5.3 \times 10^{9}$ | Unmeasurable ($1.0 \times 10^{14}$ or more) |
|  | 3 | 23 | — | 0 | Unmeasurable ($1.0 \times 10^{14}$ or more) | 0.13 | Polythiophene | $2.2 \times 10^{7}$ | Unmeasurable ($1.0 \times 10^{14}$ or more) |
|  | 4 | 23 | Li-TFSI | 1 | $4.3 \times 10^{10}$ | 4 | Azo Particles | $2.8 \times 10^{8}$ | Unmeasurable ($1.0 \times 10^{14}$ or more) |

|  |  | Pressure-sensitive adhesive layer attached optical film Surface resistance value of pressure-sensitive adhesive layer side ($\Omega/\square$) | Type of evaluation panel | | Evaluation | | | |
|---|---|---|---|---|---|---|---|---|
|  |  |  | Reference drawing | Side conduction (Ag paste) | ESD | TSP sensitivity | TSP sensitivity under humidification | Durability |
| Examples | 1 | $4.3 \times 10^{9}$ | FIG. 3 | NO | Δ | ○ | ○ | ⊙ |
|  | 2 | $4.3 \times 10^{9}$ | FIG. 3 | YES | ○ | ○ | ○ | ⊙ |
|  | 3 | $5.0 \times 10^{9}$ | FIG. 3 | YES | ○ | ○ | ○ | ⊙ |
|  | 4 | $9.4 \times 10^{8}$ | FIG. 3 | YES | ⊙ | ○ | ○ | ○ |
|  | 5 | $8.2 \times 10^{8}$ | FIG. 3 | YES | ⊙ | ○ | ○ | Δ |
|  | 6 | $1.3 \times 10^{9}$ | FIG. 3 | YES | ⊙ | ○ | ○ | ⊙ |
|  | 7 | $2.6 \times 10^{10}$ | FIG. 3 | YES | ○ | ○ | ○ | ⊙ |
|  | 8 | $4.6 \times 10^{10}$ | FIG. 3 | YES | Δ | ○ | ○ | ⊙ |
|  | 9 | $9.4 \times 10^{8}$ | FIG. 2 | YES | ⊙ | ○ | ○ | ○ |
|  | 10 | $1.3 \times 10^{9}$ | FIG. 2 | YES | ⊙ | ○ | ○ | ⊙ |
|  | 11 | $1.3 \times 10^{9}$ | FIG. 3 | YES | ⊙⊙ | ○ | ○ | ⊙ |
| Comparative examples | 1 | $8.2 \times 10^{7}$ | FIG. 3 | YES | ⊙ | X | X | X Peeling |
|  | 2 | $7.9 \times 10^{9}$ | FIG. 3 | YES | X | ○ | ○ | ⊙ |
|  | 3 | $8.7 \times 10^{9}$ | FIG. 3 | YES | X | X | X | ⊙ |
|  | 4 | $8.1 \times 10^{8}$ | FIG. 3 | YES | ○ | Δ | X | ⊙ |

In Table 1, Li-TFSI represents lithium bis(trifluoromethanesulfonyl)imide.

DESCRIPTION OF REFERENCE SIGNS

A Pressure-sensitive adhesive layer attached Polarizing film
B In-cell type liquid crystal cell
C In-cell type liquid crystal panel
1, 11 First and second polarizing films
2, 12 First and second pressure-sensitive adhesive layers
3 Anchor layer
4 Surface treatment layer
20 Liquid crystal layer
31 Touch sensor electrode
32 Touch driving electrode
33 Touch driving electrode and sensor electrode
41, 42 First and second transparent substrates

The invention claimed is:

1. An in-cell type liquid crystal panel comprising:
an in-cell type liquid crystal cell that is provided with a liquid crystal layer including liquid crystal molecules homogeneously aligned in the absence of an electric field, a first transparent substrate and a second transparent substrate sandwiching the liquid crystal layer from both sides, and a touch sensing electrode unit related to touch sensor and touch-driven functions disposed between the first transparent substrate and the second transparent substrate, and
a pressure-sensitive adhesive layer attached polarizing film that is disposed, via a first pressure-sensitive adhesive layer and without interposing a conductive layer, to the first transparent substrate side on the viewing side of the in-cell type liquid crystal cell;
wherein the pressure-sensitive adhesive layer attached polarizing film comprises a first polarizing film, an anchor layer, and the first pressure-sensitive adhesive layer in this order;
the anchor layer includes a conductive polymer; and
the first pressure-sensitive adhesive layer includes an antistatic agent.

2. The in-cell type liquid crystal panel according to claim 1, wherein a conductive structure is provided on a side surface of the anchor layer and the first pressure-sensitive adhesive layer of the pressure-sensitive adhesive layer attached polarizing film.

3. The in-cell type liquid crystal panel according to claim 1, wherein
the anchor layer has a thickness of 0.01 to 0.5 μm and a surface resistance value of $1\times10^8$ to $1\times10^{12} \Omega/\square$;
the first pressure-sensitive adhesive layer has a thickness of 5 to 100 μm and a surface resistance value of $1\times10^8$ to $1\times10^{12} \Omega/\square$; and
the surface resistance value of the pressure-sensitive adhesive layer side of the pressure-sensitive adhesive layer attached polarizing film is $1\times10^8$ to $1\times10^{11} \Omega/\square$.

4. The in-cell type liquid crystal panel according to claim 1, wherein the antistatic agent is an alkali metal salt and/or an organic cation-anion salt.

5. The in-cell type liquid crystal panel according to claim 1, wherein the touch sensing electrode unit is disposed between the liquid crystal layer and the first transparent substrate or the second transparent substrate.

6. The in-cell type liquid crystal panel according to claim 5, wherein the touch sensing electrode unit is disposed between the liquid crystal layer and the first transparent substrate.

7. The in-cell type liquid crystal panel according to claim 5, wherein the touch sensing electrode unit is disposed between the liquid crystal layer and the second transparent substrate.

8. The in-cell type liquid crystal panel according to claim 1, wherein the touch sensing electrode unit is formed by a touch sensor electrode and a touch driving electrode.

9. The in-cell type liquid crystal panel according to claim 5, wherein the touch sensing electrode unit of the in-cell type liquid crystal cell is an electrode integrally formed with a touch sensor electrode and a touch driving electrode.

10. The in-cell type liquid crystal panel according to claim 1, further comprising a second polarizing film disposed on the side of the second transparent substrate of the in-cell type liquid crystal cell via a second pressure-sensitive adhesive layer.

11. A liquid crystal display device comprising the in-cell type liquid crystal panel according to claim 10.

* * * * *